United States Patent
Baker et al.

(10) Patent No.: US 6,312,139 B1
(45) Date of Patent: Nov. 6, 2001

(54) VERTICALLY ADJUSTABLE OVERHEAD LIGHTING SYSTEM

(75) Inventors: Britt W. Baker; Michael A. O'Brien, both of Des Moines; Dick Gosselink, Runnells; Carla Peterman, Urbandale, all of IA (US)

(73) Assignee: Pioneer Hi-Bred International, Inc., Des Moines, IA (US)

( * ) Notice: Subject to any disclaimer, the term of this patent is extended or adjusted under 35 U.S.C. 154(b) by 0 days.

(21) Appl. No.: 09/448,385

(22) Filed: Nov. 23, 1999

(51) Int. Cl.$^7$ ............................................. F21V 21/14
(52) U.S. Cl. ........................ 362/145; 362/249; 362/250; 362/286; 362/386; 47/17
(58) Field of Search .................................. 362/253, 234, 362/145, 147, 249, 386, 250, 286, 404; 47/17, 58.1

(56) References Cited

U.S. PATENT DOCUMENTS

| | | |
|---|---|---|
| 1,055,020 | 3/1913 | Camph . |
| 1,631,488 * | 6/1927 | Jones .................................. 362/386 |
| 3,409,262 | 11/1968 | Soule . |
| 3,882,306 * | 5/1975 | Armstrong ........................ 362/249 |
| 3,971,967 * | 7/1976 | Hawkins ............................ 362/260 |
| 4,358,817 | 11/1982 | Bielemeier . |
| 4,734,830 * | 3/1988 | Cristian et al. ..................... 362/35 |
| 5,012,398 * | 4/1991 | Jones et al. ........................ 362/250 |
| 5,993,030 * | 11/1999 | Barcel ................................ 362/408 |

* cited by examiner

*Primary Examiner*—Thomas M. Sember
(74) *Attorney, Agent, or Firm*—G. Brian Pingel; Camille L. Urban

(57) ABSTRACT

An apparatus used to deliver light from overhead to stimulate plant growth in a controlled environment. The distance between tops of the plants and the lights can be adjusted to correlate with plant growth by a motorized assembly for raising and lowering a bar suspended from an upper support and upon which are mounted growth lights. Horizontal sway of the bar upon which the growth lights are mounted is minimized by a guiding structure for one end of the bar. When florescent growth lights are used, bulk and heat produced by their ballasts are eliminated by locating all ballasts remotely from the apparatus.

6 Claims, 2 Drawing Sheets

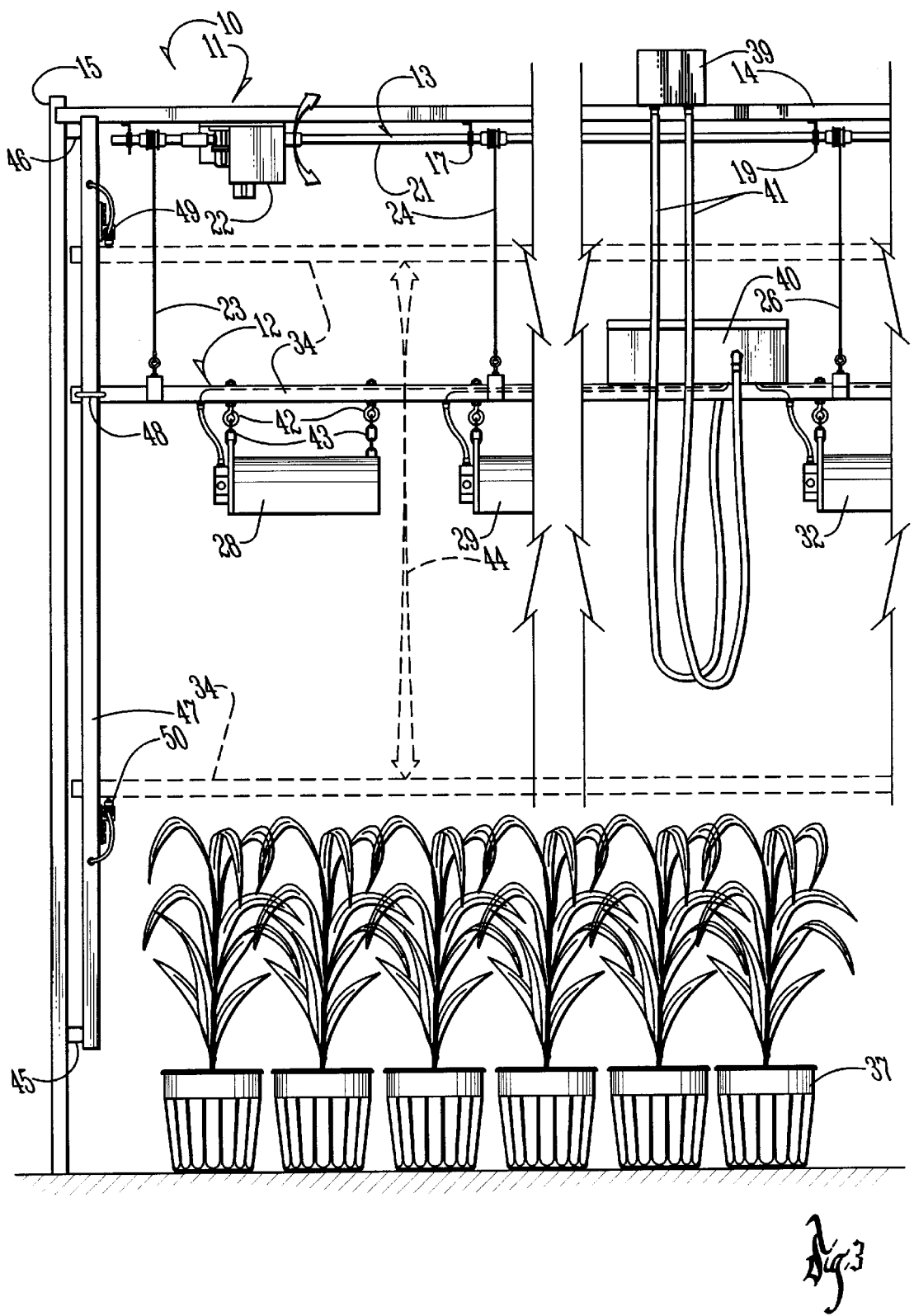

VERTICALLY ADJUSTABLE OVERHEAD LIGHTING SYSTEM

BACKGROUND OF THE INVENTION

1. Field of the Invention

The invention relates in general to overhead lighting systems for growing plants, and more particularly, to systems for delivering light to plants to stimulate plant growth, produce strong and healthy plants, and increase plant yields.

2. Description of the Prior Art

Various techniques and apparatuses have been developed over the years to increase growth rates and increase yields of plants in order to meet research demands and the worldwide need for increased food supplies. Because plant growth is limited mostly by light, moisture, and nutrients, the provision of these, in both natural and controlled environments, has been the focus of much of the development in this area.

Light is the primary energy source for photosynthesis which, in turn, is the process by which most of the plant growth occurs. Without the proper amount of light, plants are not as productive as they could be. In controlled environments provision of adequate light is a major challenge. Therefore, light delivering apparatuses of one kind or another have been widely used. Overhead lights have often been installed in a controlled and enclosed environment to deliver light to plants. But, if the enclosed environment is designed to take cost-saving advantage of natural light, overhead lights are somewhat counterproductive in that they produce shade on the upper leaves of at least some of the plants. Often the position of prior art overhead lights are vertically fixed so that smaller plants may not receive the amount of light they need. In addition, the makeup of the prior art lights often produce heat which, in combination with heat produced in a controlled environment by natural light, exceeds the heat tolerance of the very plants for which the benefit of light is being provided.

Accordingly, in view of the deficiencies of prior art lighting systems, what is needed is an apparatus that will allow adjustable vertical placement of lights correlated to plant heights and which creates minimal shade and minimal heat.

Prior art has addressed the problems of delivering light by vertically adjustable means for the theater stage, for medical apparatus delivering radiation or light, and for lighting needs in work areas of offices and factories. For plant growth, prior art discloses mounted reflective louvers with attitude adjustment to direct natural light and the widely used, vertically stationary, suspended lights. The apparatus for delivering light to stage borders disclosed in U.S. Pat. No. 1,055,020 to Camph is specific to lighting for theater stages and teaches the use of counterweights and pulleys to control the vertical placement of a light from the opposite side of the stage.

Another U.S. Pat. No. 4,358,817 to Bielemeier discloses a vertically adjustable lighting apparatus for a cosmetic or medical radiation emitting device. The Bielemeier invention concerns a relatively complicated system of drive shaft and winding drums mounted in a frame which move vertically with the lights and placement of suspension straps to decrease swing of the apparatus. Such patent also refers to a known device where the motor and spaced apart reels were mounted near the ceiling and worked to raise and lower the frame on which lights were mounted. However, in the prior art referenced by Bielemeier horizontal swing and oblique positioning were a problem which Bielemeier's teachings addressed via placement of suspension straps.

Yet another U.S. Pat. No. 3,409,262 to Soule provides an apparatus for raising and lowering lights in factories and larger buildings. The Soule apparatus consists of a pulley system connected to a motor which allows suspended light fixtures to be raised and lowered for maintenance and to address lighting needs in the workplace.

None of the prior art teachings referred to above show or suggest that the inventions disclosed are useful for stimulating the growth of plants. Furthermore, even the application of such prior art to delivering light to plants would not address many of the problems encountered by using overhead lighting to stimulate plant growth in a controlled environment. Although the Bielemeier patent teaches a system employed to minimize swing, the system is relatively complex and contemplates the mechanics as part of the light frame. This would require a larger frame and, hence, create more shade in natural light. Soule's teachings include a complex pulley system for vertical adjustment and does not adequately accommodate for horizontal swing. Moreover, neither the Bielemeier or Soule patent disclose structures that minimize the heat generated by the lights themselves.

It is therefore one object of the invention to provide a simple means for raising and lowering overhead lighting apparatus without creating additional bulk and shade.

It is another object of the invention to provide a means to greatly reduce horizontal swing of the lighting apparatus.

It is, finally, an object of the invention to reduce the heat produced by the plurality of lights in the apparatus.

SUMMARY

The present invention provides an overhead lighting apparatus for stimulating plant growth which delivers light in accordance with a plant's height; more specifically, the invention resides in an upper support structure with means to attach an elongated bar upon which are mounted growth lights and means to adjust distance between said elongated bar and said upper support structure.

As a result, the embodiment of this invention results in advantages not provided by prior art overhead light delivery systems or overhead lighting systems for stimulating plant growth. Two principal advantages of the present invention are that it provides a means to raise and lower the lights in a simplified fashion and a means to insure that the horizontal swing of the elongated light bar is greatly reduced by attaching one end of said bar to a vertical track.

Another advantage over the prior art is the avoidance of increased bulk of the light fixtures shown in the prior art to accommodate pulley systems incorporated therein. This bulk would create shade in a controlled environment utilizing natural light. In addition, the prior art does not provide a way to reduce the heat produced by the lights. The present invention addresses both of these problems by providing growth lights from which the ballasts have been removed and located remotely from the apparatus and to which power is provided via electrical cords, cables, and conduits.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 3 is a front fragmentary view in elevation of one end of the apparatus in FIG. 2 showing it in more detail.

DESCRIPTION OF THE PREFERRED EMBODIMENT(s)

Figure 1:
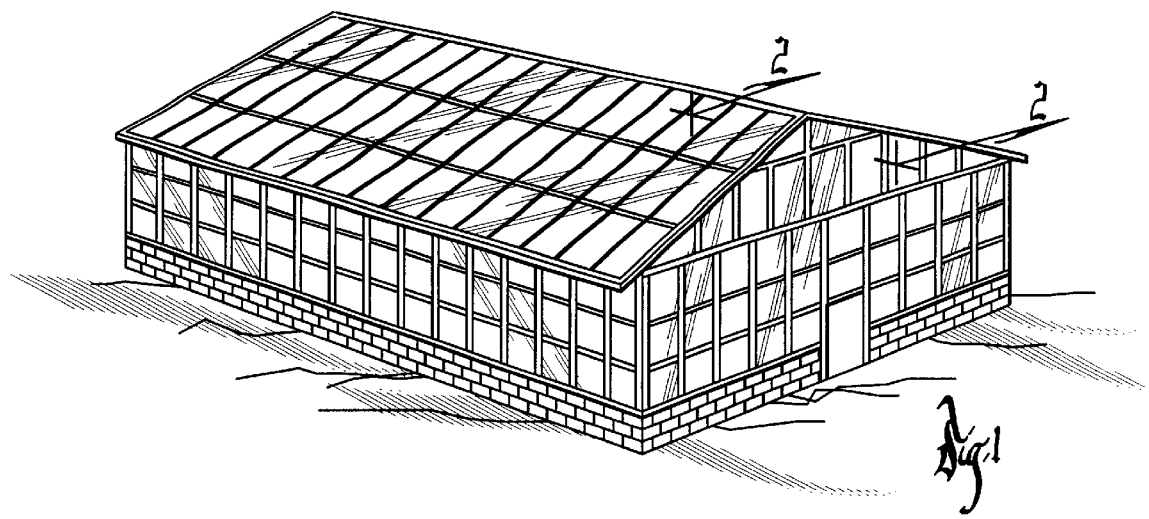
FIG. 1 is a perspective view of a controlled environment for plant growth.

Referring to FIG. 1 a controlled environment, commonly referred to as a greenhouse, which utilizes natural light as well as indoor artificial lighting to stimulate plant growth is shown. An apparatus that provides lighting for plant growth that employs a preferred embodiment of the present invention is shown generally as 10 in FIG. 2. The apparatus 10 is of a relatively simplistic construction and comprises an upper support structure 11, that serves as a means from which a light assembly 12 is suspended, and has an adjusting means 13 for vertically adjusting said light assembly 12.

The upper support structure 11 includes a substantially horizontally aligned support beam 14 secured in an elevated position by side supports 15 and 16. The support beam 14 is rotatably attached by a plurality of brackets 17–20 to a winding shaft 21. Also attached to the upper support structure 11 is a motor 22 for turning the winding shaft 21. The winding shaft 21, in turn, is attached by a plurality of horizontally spaced apart cables 23–29 to the light assembly 12.

Figure 2:
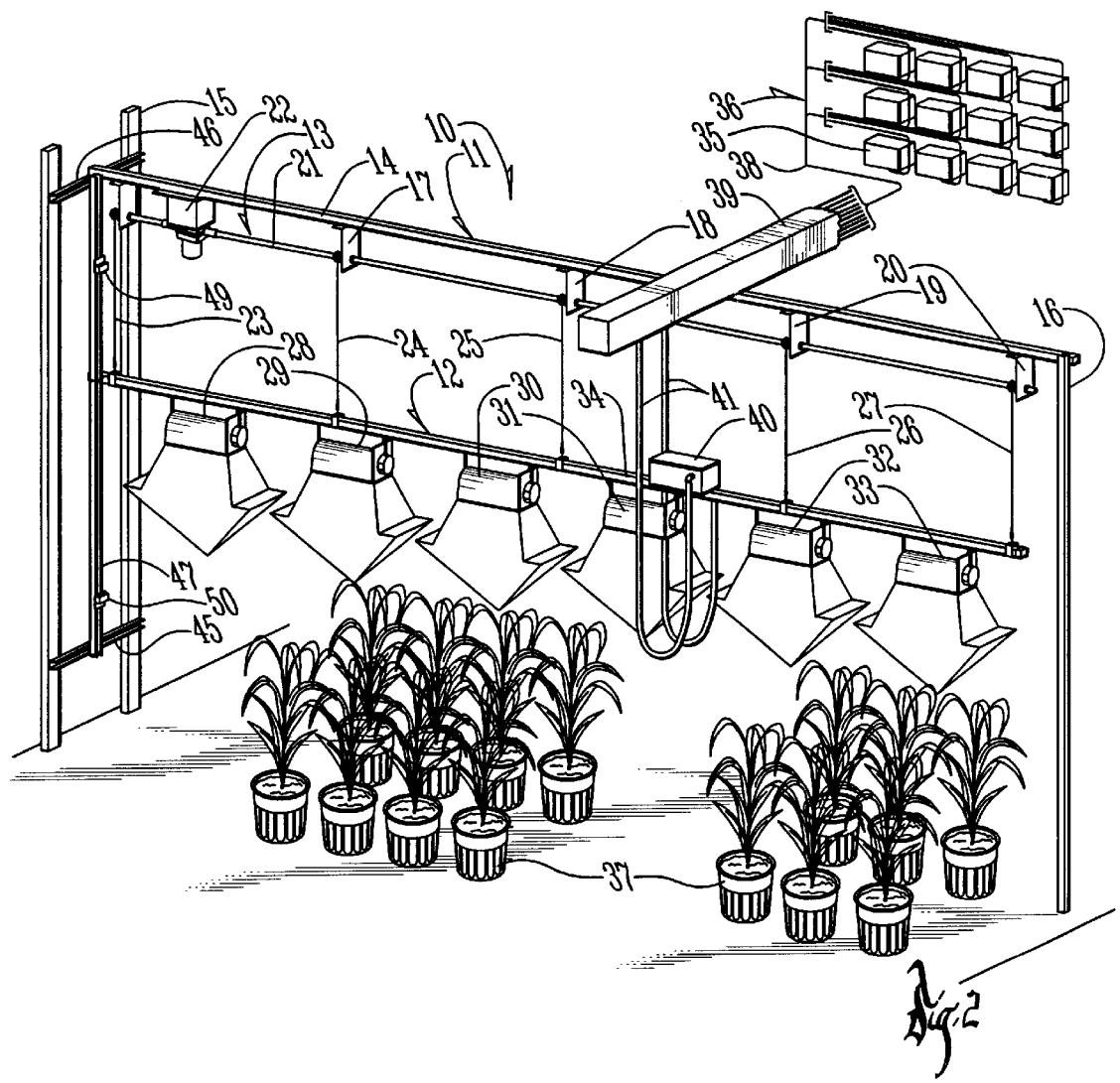
FIG. 2 is a perspective view along line 2—2 of FIG. 1 showing an overhead lighting apparatus for stimulating plant growth which includes the present invention and a fragmented view of the remote placement of ballasts forming part of the apparatus.

The light assembly 12, as shown best in FIG. 2, is formed by mounting growth lights 28–33 on an elongated bar 34 in a horizontally spaced apart manner. The lights 28–33 are preferably High Intensity Discharge (HID) or florescent growth lights, but they may be any type of light source used to enhance plant growth. As is well known in the art, some growth lights 28–33 include a ballast 35. However, contrary to this growth light construction, the ballasts 35 have been removed from the growth lights 28–33 to a remote location 36. In the preferred embodiment, the remote location 36 is a separate room which keeps the heat generated by the ballasts 35 away from the plants 37. The ballasts 35 are connected to the growth lights 28–33 by means of electrical cords 38 concealed in a conduit 39 along a path from the remote location 36 to the overhead lighting apparatus 1 0. The conduit 39 can conceal and guide cords 38 from a multitude of ballasts 35 to a number of different overhead lighting apparatuses.

The more detailed FIG. 3 shows that the conduit 39 and a distribution box 40 for supplying electricity to the growth lights 28–33 are connected by cables 41. The additional detail of the mounting of the growth lights 28–33 to the elongated bar 34 shown in FIG. 3 reveals that the preferred embodiment attaches the growth lights 28–33 to the elongated bar 34 by use of eyebolts 42 and short lengths of chains 43.

Continuing with reference to FIG. 3, the motor 22 is operatively connected to the winding shaft 21 to turn it either direction, lengthening or shortening the distance 44 between the support beam 14 of the upper support structure 11 and the light assembly 12 thereby raising and lowering said assembly above plants 37.

It is preferred that horizontal sway of the light assembly 12 be limited. Referring to both FIGS. 2 and 3, upon one of the side supports 15 of the upper support structure 11 are mounted cross members 45 and 46. Attached to said cross members 45 and 46 is a vertical guide 47. FIG. 3 shows the preferred embodiment in which the vertical guide 47 is encircled by a simple metal loop 48 the same shape but slightly larger than the vertical guide 47 which is, in turn, attached to one end of the light assembly 12. This allows for free vertical movement along the length of the vertical guide 47 but severely restricts horizontal sway of the light assembly 12.

The vertical range of movement 44 of the light assembly 12 is controlled by limiting switches 49 and 50 mounted on the vertical guide 47 to provide automatic stops so that the light assembly 12 is not raised or lowered beyond the desired limits.

Thus, the present invention has been described in an illustrative manner. It is to be understood that the terminology that has been used is intended to be in the nature of words of description rather than of limitation.

Many modifications and variations of the present invention are possible in light of the above teachings. For example, the upper support structure could be suspended from the ceiling or rafters in the controlled environment rather than being supported by vertical side members. Therefore, within the scope of the appended claims, the present invention may be practiced otherwise than as specifically described.

What is claimed is:

1. Overhead lighting apparatus located in a room in a building structure for stimulating plant growth with means for vertical adjustment according to plant height comprising:
   a) a light assembly having:
      1) an elongated bar substantially horizontally aligned; and
      2) a plurality of growth lights mounted on said elongated bar;
   b) an upper support structure not integral to said building structure and having means for supporting said light assembly in a position above said plants and for vertically adjusting the position of said light assembly;
   c) said upper support structure further comprising:
      1) a support beam supported in an elevated position above the floor of said room by vertically oriented side members;
      2) a winding shaft;
      3) means to rotatably attach and support said winding shaft to said support beam; and
      4) a plurality of cables with means to attach one end of each of said plurality of cables to said winding shaft and the other end to said elongated bar; and
   d) means for securing said upper support structure in a position above said light assembly; and
   e) said means for adjusting the position of said bar further comprising a motor operatively connected to said winding shaft, and fixedly attached to said support beam.

2. Overhead lighting apparatus as claimed in claim 1 including means to eliminate horizontal swing of said elongated bar comprising:
   1) a fixed vertical guide; and
   2) means to slidably attach one end of said elongated bar to said vertical guide in a manner to allow vertical movement therebetween.

3. Overhead lighting apparatus for stimulating plant growth with means for vertical adjustment according to plant height comprising:
   a) a light assembly having:
      1) an elongated bar substantially horizontally aligned; and 2) a plurality of growth lights mounted on said elongated bar;
b) a plurality of ballasts located remotely from said plurality of growth lights;
c) means to move power from said plurality of ballasts to said plurality of growth lights;
d) an upper support structure having means for supporting said light assembly in a position above said plants and for vertically adjusting the position of said light assembly further comprising a winding shaft and a motor operatively connected to said winding shaft and fixedly attached to said upper support structure;
e) means to actuate said motor mounted in a fixed location;
f) means for securing said upper support structure in a position above said light assembly; and
g) means to eliminate horizontal swing of said elongated bar comprising:
  1) a fixed vertical guide; and
  2) means to slidably attach one end of said elongated bar to said vertical guide to allow only vertical movement.

4. Overhead lighting apparatus for stimulating plant growth as claimed in claim 3 wherein vertical range of movement of said elongated bar is governed by limiting switches mounted on said fixed vertical guide.

5. Overhead lighting apparatus for stimulating plant growth as claimed in claim 3 wherein said means to slidably attach one end of said elongated bar comprises a loop attached to one end of said elongated bar of same shape and slightly larger and fitted around said vertical guide.

6. Overhead lighting apparatus in a building structure for stimulating plant growth with means for vertical adjustment according to plant height comprising:
a) a light assembly having:
  1) an elongated bar substantially horizontally aligned; and
  2) a plurality of growth lights mounted on said elongated bar;
b) an upper support structure not integral to said building structure and having means for supporting said light assembly in a position above said plants;
c) means associated with said upper support structure for vertically adjusting the position of said light assembly and comprising a winding shaft, a plurality of cables attached to said winding shaft and to said light assembly, and a motor;
d) means for securing said upper support structure in a position above said light assembly comprising vertical supports; and
e) a guide element mounted on and parallel with said vertical supports and further associated with said light assembly so as to minimize horizontal swing.

* * * * *